United States Patent
Wagner

(10) Patent No.: US 8,805,571 B2
(45) Date of Patent: Aug. 12, 2014

(54) METHOD FOR NEED-BASED ORDER-PICKING OF MEDICINE PORTIONS IN DISPENSING PACKS

(75) Inventor: Rudolf M. Wagner, Daun (DE)

(73) Assignee: Rowa Automatisierungssysteme GmbH, Kelberg (DE)

(*) Notice: Subject to any disclaimer, the term of this patent is extended or adjusted under 35 U.S.C. 154(b) by 405 days.

(21) Appl. No.: 12/919,187

(22) PCT Filed: Feb. 25, 2009

(86) PCT No.: PCT/EP2009/001337
§ 371 (c)(1),
(2), (4) Date: Sep. 21, 2010

(87) PCT Pub. No.: WO2009/106312
PCT Pub. Date: Sep. 3, 2009

(65) Prior Publication Data
US 2011/0035047 A1 Feb. 10, 2011

(30) Foreign Application Priority Data
Feb. 25, 2008 (EP) .................... 08151912

(51) Int. Cl.
*G06F 7/00* (2006.01)
(52) U.S. Cl.
USPC .............. 700/214; 700/242; 221/1; 221/2; 53/493
(58) Field of Classification Search
USPC ........................................ 700/214
See application file for complete search history.

(56) References Cited

U.S. PATENT DOCUMENTS

| | | | |
|---|---|---|---|
| 6,318,051 B1 * | 11/2001 | Preiss | 53/493 |
| 2004/0253083 A1 | 12/2004 | Gambarelli | |
| 2005/0240305 A1 * | 10/2005 | Bogash et al. | 700/242 |
| 2007/0084150 A1 | 4/2007 | Siegel et al. | |
| 2008/0149656 A1 * | 6/2008 | Yuyama et al. | 221/2 |
| 2008/0272138 A1 * | 11/2008 | Ross et al. | 221/1 |

FOREIGN PATENT DOCUMENTS

| | | |
|---|---|---|
| DE | 19757963 | 7/1999 |
| DE | 102005063197 | 7/2007 |
| DE | 102006027521 | 12/2007 |
| FR | 2753370 | 3/1998 |

OTHER PUBLICATIONS

International Search Report of PCT/EP2009/001337 dated May 25, 2009.
Written Opinion of PCT/EP2009/001337 dated May 25, 2009.

* cited by examiner

*Primary Examiner* — Gene Crawford
*Assistant Examiner* — Kyle Logan
(74) *Attorney, Agent, or Firm* — McDermott Will & Emery LLP

(57) ABSTRACT

In a method for need-based order-picking of medicine portions, several medicine portions of a defined type are firstly identified in several blister packs of different dimensions having receiving chambers and are placed in an automated storage facility. Data identifying the blister packs are saved in association with designations of their storage locations. A dispensing pack is then made ready at an automatic filling station and is filled as needed. Finally, the filled dispensing pack is placed in the same or another automated storage facility, if the dispensing pack is not yet intended to be distributed.

18 Claims, 1 Drawing Sheet

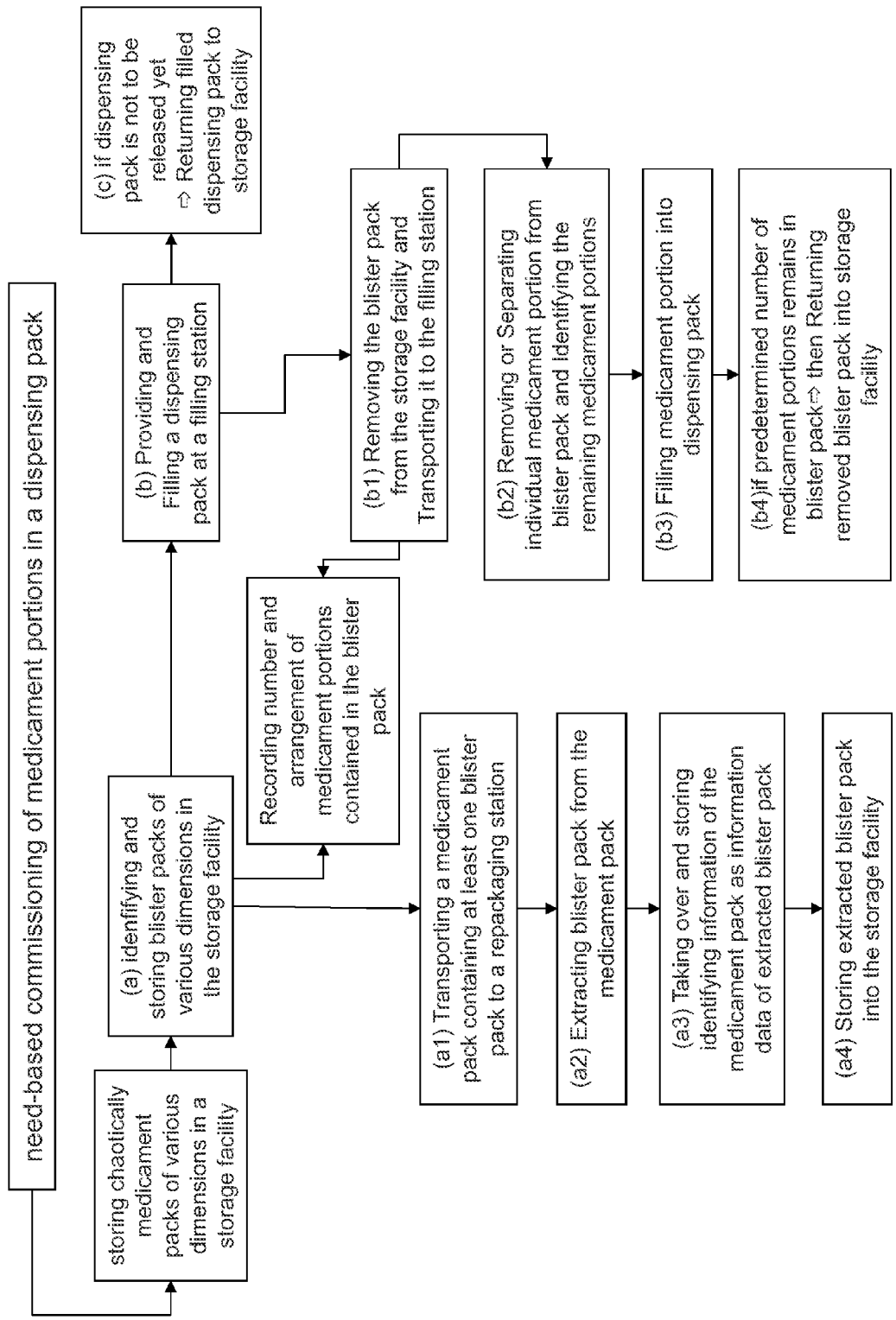

METHOD FOR NEED-BASED ORDER-PICKING OF MEDICINE PORTIONS IN DISPENSING PACKS

BACKGROUND

The invention concerns a method for need-based requisitioning or commissioning of medication or medicament portions in dispensing packs.

Medications or medicaments are given out to patients, medical personnel, or nurses or to their caregivers in basically two different types of packaging. On the one hand, there are medication or medicament packs that are usually given out by pharmacists and which each contain a plurality of identical medication or medicament portions such as, for example, blisters containing several tablets, capsules, or suppositories. Here the patient or his caregiver is himself responsible for the correct removal and dosing of the individual medication portions from the medication packs. As a rule, he receives tips for this from a pharmacist. A second form of dispensing medications is called a "dispensing pack" here. The dispensing pack contains several reception chambers, into each of which one or several medication portions are filled, to each reception chamber of which is assigned a characterization, for example the administration times (date, day of the week, time of day). Each reception chamber can contain several different medication portions. But it is also conceivable that exactly one chamber is provided for each individual medication portion, whereby, for example, several chambers are assigned to the same administration time. Moreover, the medication portions can also be divided up in the chambers so that each chamber contains only identical medication portions. The medication portions themselves contained in the chambers can also still be wrapped with separate packaging. Such dispensing packs have, for example, the form of blisters, in which the individual chambers are formed between two foils connected to one another (for instance hot-sealed). But the dispensing packs can also be constructed in an arrangement of cartons or little boxes connected to one another.

Such dispensing packs are currently frequently filled manually, in which a practitioner (for instance the personnel in a pharmacy, a hospital, or a nursing home) first transports to a workplace a series of conventional medication packs which each contain several blister packs, there prepares the empty packs to be filled for the dispensing packs with several reception chambers each, and then removes from the individual medication packs the necessary number of medication portions respectively and fills in the correct respective reception chambers of the dispensing packs to be filled. The individual medication portions are, for example, squeezed out of conventional blister packs, several of which are each contained in a conventional medication pack, whereby they then fall directly into the appropriate reception chamber of the dispensing pack. Then the partly emptied blister packs are packed back into the conventional medication packs. The partially filled blister packs containing the medication packs are then laid at a storage site for later removal of further medication portions. The dispensing pack filled with the medication portions can then be closed up. Errors can occur in this manual production process for dispensing packs. For example, individual medication portions can be filled into the wrong chamber, or the case may occur that too great a number of medication portions is removed from the medication pack and the excess medication portions subsequently inadvertently not put back into this medication pack but into another one; likewise if the medication pack being prepared at the workplace is filled back up with another type of medication.

One solution to this problem could be in the automation of the overall process. For example, there are automated dispensing devices, in which the medication portions that are to be filled into the dispensing packs are made available in advance in special cases, in which the cases are filled with a large number of medication portions put in loosely and are made available by means of a specially integrated dispensing arrangement for dispensing individual medication portions. The dispensing device can include several case receivers, which can each receive one case with a predetermined type of medication portion. The dispensing device can further include a trigger arrangement which can activate the dispensing arrangement of a case containing a case receiver such that medication portions are issued in a predetermined number from the case. The dispensing device then transports the removed medication portion into the correct reception chamber of the dispensing pack and for its closure. According to patent specification DE 10 2005 063 197 B4, such a dispensing device can, for instance, be combined with a medication-storage machine, whose dispensing device provides for storing the case, its transport to the case receiver of the dispensing device, and its transfer. The medication-storage machine used for a dispensing device is, for example, of a type such as is described in the patent specification DE 195 09 951 C2. These known dispensing devices have the drawback that they require special cases with an integrated dispensing arrangement in which the medication portions are loosely laid. Use of conventional medication packs which contain several blister packs, for instance, is not possible for dispensing medication portions to be filled from dispensing packs.

BRIEF DESCRIPTION

A task of the invention is to minimize the errors of manual production mentioned at the beginning, without dispensing devices with special cases for medication portions having to be used.

This problem is solved according to the invention by a method for the need-based requisitioning or commissioning of medication portions in dispensing packs.

With the method according to the invention for the need-based commissioning of medication or medicament portions in dispensing packs when using an automated storage, in which a plurality of different medication or medicament packs is placed or stored chaotically with optimum utilization of space in storage areas having storage surfaces of level shelves or slanted chutes, wherein the medication packs are stored or removed from the storage surfaces with the aid of at least one computer-controlled control unit or operating device, wherein blister packs of different sizes, each containing several medication or medicament portions of a specific type in several reception chambers, wherein the reception chambers in the case of the different blister packs can be arranged in various ways, are then identified in a step (a) with the aid of at least one computer-controlled control unit and are placed in the automated storage so that the automated storage facility will contain blister packs in addition to the medication packs. At the same time, the data identifying the individual blister packs are stored or saved according to the characteristics of their respective storage site. The blister packs to be stored are, for example, removed before the conventional medication packs or even wholesale packs, are identified in advance, and are stored in the automated storage.

In a step (b), at least one of the dispensing packs to be filled (also called a "customer container") is provided at an automated filling station and is filled as needed, while for each type of medication portion in the dispensing pack to be filled into the dispensing packs, the following steps are performed: (b1) one blister pack containing this type is retrieved or removed by means of a control unit or operating device from the automated storage facility and is transported to the filling station; (b2) at least one individual medication portion is removed from the blister pack or separated from it by a device for the separation of medication portions, wherein the number of the medication portions remaining in the blister pack is calculated or identified; (b3) the at least one removed or separated medication portion is filled into at least one predetermined reception chamber of the dispensing pack; and (b4) the blister pack is returned to the automated storage facility, provided that at least a predetermined number of medication portions (e.g., one medication portion) remains in the blister pack.

Then in a step (c), the filled dispensing pack is returned and stored in the same or another automated storage facility, provided the dispensing pack is not to be issued or released yet (for example, to a patient, customer, or physician or into a non-automated storage). The number and the arrangement of the medication portions contained in the blister pack are (i) recorded upon storing the blister pack in the first step mentioned above (i.e., step (a)) and are stored according to the identifying data or (ii) are recorded or detected after the removal of the blister pack in the step (b1) mentioned above and before the removal or the separation of the at least one medication portion in the step (b2) mentioned above.

Based on recording according to the invention the number and arrangement of the medication portions contained in a blister pack and their tracking over the removal process, it is possible, for the production of the dispensing pack ("customer container"), for conventional blister packs to be used out of conventional medication packs. Further, this flexibility leads to the method according to the invention being able to utilize the known storage principles of medication-storage machines for preparing blister packs. Naturally, the storage places and the control unit, if necessary, are to be adapted for handling blister packs.

In a preferred embodiment of the method according to the invention, in step (a) of the storage of the blister packs in the automated storage facility, the following steps are performed: (a1) a medication pack, which contains at least one blister pack in a package, is transported to a packing station; (a2) the at least one blister pack is removed or extracted from the package; (a3) identifying information for the medication pack is transferred and stored as the identifying data for the at least one blister pack; and (a4) the at least one blister pack is inserted or stored into the automated storage facility, whereby the identifying information stored as identifying data are related to the identification of the storage sites.

In a preferred embodiment of the method according to the invention, the medication pack in step (a1) is retrieved from the automated storage facility or from another automated storage and the identifying information is automatically transferred by control equipment of the automated storage facility in step (a3). This has the advantage that after the removal of the blister packs from the medication pack, no input of information identifying the medication is necessary. Depending on the data made available for the medication pack, it is even possible that information on the number and arrangement of the medication portions contained in the blister pack is removed from the storage by the control equipment of the automated storage facility (control computer). Should this information not, however, be available, for example, then this is to be fully recorded, for instance by optically recording or by measuring the blister pack removed.

In another preferred embodiment of the method according to the invention, the medication pack is retrieved or removed in step (a1) from the same automated storage facility in which the isolated blister pack is stored in step (a4). The blister packs can be stored at the same time in the same storage area in which the conventional medication packs are also placed. But it is also possible that the blister packs are stored in storage areas specially adapted for storing such packs. These storage areas can, for example, be flat areas or inclined compartments out of which the blister packs project toward the front, for instance, or vertical slots into which the blister packs are inserted.

In one embodiment of the method, the blister pack is manually removed in step (a2) by a practitioner from the medication pack transported thereto, and the identifying information is transferred in step (a3) by reading an identification means of the medication pack. Printed barcodes, transponder chips (RFIDs), or other means, for example, serve as identification means which link the readable identifying information to the packaging. The transfer can occur, for example, by a scan of the barcode or querying the RFID chip, as well as by automated data transfer, or even by manual transfer, that is, manual input of the data. The data can also be transferred after scanning a barcode, for example from a database that is linked to the control equipment.

In a preferred embodiment of the method according to the invention, the blister packs are stored in the automated storage facility, in which the blister packs are each fastened onto a holder or at a holder. The holder is so constructed that a control unit can grasp and transport the holder with the blister pack lying on it or fastened to it. The holder can, for example, be a clip which on the one hand is clipped fast to the blister pack and on the other hand exhibits arrangements that allow storage adapted to the type of the blister pack and an intervention of the control unit or operating device. For instance, the holder can be constructed so that the blister pack can be hung onto a rail by means of the control unit and can be removed again. But a flat tray can also be involved in the case of the holder, on which the blister pack can simply be laid out, and it likewise exhibits arrangements (a front wall, for example) for the control unit to grab on. In a further development of this embodiment of the method according to the invention, the holder exhibits an identification means containing information identifying the holder. The identification means is any means that is connected to the holder and can make readable information available, for instance a barcode or a transponder chip. The identification means of the holder is read upon or after the fastening or the retrieval of the blister pack and the information identifying the holder is (by means of software) assigned to the information identifying the blister pack. The same holder can thereby be used several times for different blister packs. The assignment of the holder identification for the identification of the assigned blister pack can be performed in the control equipment's memory. The identification means of the holder can also be omitted. In this case, an equivalent identification means is provided on the blister pack itself. It is even conceivable that on the blister pack according to each medication portion, an identification means is introduced identifying the medication portion, for example, a small two-dimensional barcode can be provided on the blister pack. Storage is also conceivable for which the identifying information is assigned, internal to the computer only, to the storage site of the blister pack, without the blister pack itself or the holder exhibiting identification means. This can lead, however, to identification loss upon damage to the data in memory. It is also conceivable that the transferred information identifying the medication pack is transferred to an identification means (a transponder chip, for instance) of the holder upon or after the fastening of the blister pack to or placement on the holder.

In one embodiment, the data identifying the blister pack can include the data identifying medication contained in the medication portion and expiration data. Moreover, information can still be assigned for the type of storage and further information.

In one preferred embodiment of the method according to the invention, the number of medication portions contained in the blister pack upon storing the blister pack in step (a) is recorded and stored according to the identifying data, in which this stored number is accordingly incremented respectively upon the removal or the separation of the at least one medication portion in step (b2). Additionally, it is possible that the arrangement of the medication portions contained in the blister pack is also recorded upon storage and then stored. In one embodiment, the number and/or arrangement of the medication portions contained in the blister pack are recorded in step (b1) and before the removal or the separation of the at least one medication portion in step (b2), in which the retrieved blister pack is measured. The measurement includes, for example, a weighing and/or an optical scanning of the dimensions or of the identification means introduced. The number and the arrangement of the medication portions contained in the blister pack must be known before the step of removal or separation of the medication portion, at least to the extent that a targeted removal/separation by the isolating device is possible. For example, embodiments are conceivable in which the number is already recorded and stored upon storing the blister packs in the automated storage facility and is incremented accordingly upon each removal, wherein the arrangement of the medication portions in the blister pack is recorded first upon or after the removal of the blister pack from the storage.

The medication portions to be filled into the dispensing pack can be both removed from the blister pack (squeezed out, for instance) or separated from it. In one embodiment, the medication portions are separated from the blister pack such that they remain held by a separate blister section. In another preferred embodiment, the medication portions are each removed from the blister pack, in which they are squeezed out, whereby the medication portions are immediately filled, after the removal in step (b3), into a reception chamber of the dispensing pack. Preferably, the medication portions are squeezed out and immediately or directly filled in such a way that it will not touch any parts of the separation device. This prevents contamination of the device parts by the rest of the different medication portions.

Further advantageous and/or preferred developments of the invention are characterized in the subclaims. In the following, the invention is described in more detail with the aid of a preferred embodiment of the method according to the invention.

BRIEF DESCRIPTION OF THE FIGURES

FIG. 1 is a flow chart of a method for the need-based commissioning of medicament portions in dispensing packs according to the present disclosure.

DETAILED DESCRIPTION

In a preferred embodiment of the method according to the invention, and with reference to FIG. 1, conventional medication packs, a few of which contain one or several blister packs, are first stored in a storage machine. Such a storage machine is described, for example, in the patent specification DE 195 09 951 C2 or in the application publication of EP 1 762 511 A1. For storing the conventional medication packs, both a shelf system with flat shelf-trays and a chute system with inclined or slanted storage chutes can be used or a combination of the two. The medication packs are chaotically stored with optimum utilization of space, in which one or several control units and the transport devices provide for storage and retrieval.

According to the invention, individual blister packs are provided first, in addition to the conventional medication packs, to be placed in the automated storage facility. At the same time, the blister packs can, for example, likewise be placed on flat shelf-trays or in inclined chutes, in which the control unit is fitted with a gripping arrangement for grasping such blister packs. But the individual blister packs can also be placed in a special storage area, which is adapted to their storage, for instance narrow vertical or horizontal compartments, or it can be configured with devices for hanging the blister packs fastened to a holder. A blister pack hanging vertically or standing in a compartment could, for example, be caught by gripper jaws and a blister pack lying down could be caught by a suction gripper operating from above at the blister. Preferably, the blister packs are provided with special holders, which make the grasp of the control unit or operating device easier, and an integral mechanical interface is made available for the control unit.

For storing the blister packs in the automated storage facility, individual medication packs are first retrieved in a conventional way from the automated storage facility, that is, grabbed by a control unit or operating device and transported to a packing station. Naturally, medication packs that have not yet been stored in the automated storage facility can also be manually made available at the packing station. A user removes the individual blisters from these medication packs that were transported to the packing station and transfers them individually to a control unit or a transport arrangement for further storing in the automated storage facility. In this process, the identifying information assigned to the previously retrieved medication pack (medication identification and expiration data, for instance) are transferred and saved for the blister packs to be stored again. Because the control equipment knows, after the re-storage of the blister packs, the site at which a certain blister pack is stored, no information arrangement (for example, a barcode or RFID) is to be exhibited once the blister pack itself is broken, since the identifying information can simply be assigned to the storage site. However, in order to increase handling security, each blister pack is assigned an identification means. It is thereby conceivable that the blister packs are provided from the start with identification means such as, for instance, a barcode. In another embodiment, identifications means can be assigned to a holder, which is connected to the blister pack. The identification of the holder is then assigned, internally to the computer, to the identification of the blister pack.

If an order now arrives for the need-based requisitioning or commissioning of medication packs in dispensing packs, that is, an order for the production of dispensing packs for customers, the process is as follows. First it is established whether the blister packs necessary for handling the order are in the automated storage facility in isolated form or inside conventional medication packs. If they are still in conventional medication packs, these are first retrieved one after the other, whereby a practitioner removes the blister packs and stores them again in the machine, as described above.

Then the individual blister packs needed for the dispensing pack are automatically retrieved from the storage machine and an automated unblistering unit is made available. In this unit, individual medication portions of the blister packs are removed and filled directly into the reception chambers provided in the dispensing pack. For example, a blister pack for a first type of medication portion, for instance a first tablet type, is retrieved from the machine and transported to the unblistering unit. The unit removes one or several tablets in the desired way, in which it squeezes the tablets out of the blister pack, and fills the tablets removed into the reception chambers provided. For example, a dispensing pack is produced which contains one reception chamber each for the seven days of the week respectively and three administration times each (morning, noon, and evening) and if the first tablet should be taken out in the morning, the unblistering unit squeezes out seven tablets one after the other from the blister pack and provides for filling the tablets into chambers provided for the morning removal. Provided the number of medication portions contained in a blister pack (or the medication portions remaining therein) is not sufficient for the complete filling of the dispensing pack, a further identical blister pack is retrieved, if necessary, and transported to the unblistering unit. If the filling of the first medication type is finished, a blister pack with a second type of medication is retrieved, as needed, for example, a blister pack with several medicine capsules, and is transported to the unblistering unit. Then in the same way, an appropriate number of medication portions (capsules) is filled into the desired reception chambers of the dispensing pack. This process is repeated automatically as often as needed until the desired medication portions are placed in the desired number into the reception chambers provided in the dispensing pack. Then the dispensing pack is just closed up, if necessary, for instance the reception chambers are enclosed between two foils.

In this way, the filled dispensing pack can be subsequently issued (for example to a customer or to a non-automated storage facility) or even stored again in the automated storage facility, provided it is not needed yet. In this way, orders are requisitioned ahead of time and are then retrieved at a later time from the machine.

The invention claimed is:

1. A method for need-based commissioning of medicament portions in dispensing packs, comprising:
    providing an automated storage facility and chaotically storing a plurality of different medicament packs under optimal utilization of space on storage surfaces of level shelves or slanted chutes;
    placing onto or removing from the storage surfaces the medicament packs with the aid of at least one computer-controlled operating device;
    (a) identifying and storing, in the automated storage facility, blister packs of various dimensions, each containing several medicament portions of a certain kind in several reception chambers, arranging the several reception chambers in a case of the blister packs in various ways so that the automated storage facility will contain blister packs in addition to the medicament packs, and saving data identifying individual blister packs in relationship to identifications of respective storage sites of the individual blister packs;
        (a1) transporting a medicament pack containing at least one blister pack in an outer package to a repackaging station;
        (a2) extracting the at least one blister pack from the outer package;
        (a3) taking and storing identifying information of the medicament pack as identifying data of the at least one extracted blister pack;
        (a4) storing the at least one blister pack into the automated storage facility, and relating the identifying information stored as identifying data to the identifications of the storage sites;
    (b) providing at least one dispensing pack to be filled at an automated filling station and filling the at least dispensing pack as required for each type of the medicament portions to be filled into the dispensing packs;
        (b1) removing a blister pack containing a type of medicament to be filled from the automated storage facility by means of the operating device or of one of the operating devices and transporting the blister pack to the filling station;
        (b2) removing at least one individual medicament portion from the blister pack or separating at least one individual medicament portion from the blister pack by a device for the separation of medicament portions, and identifying the number of medicament portions remaining in the blister pack;
        (b3) filling the at least one removed or separated medicament portion into at least one predetermined reception chamber of the dispensing pack;
        (b4) returning the blister pack into the automated storage facility if at least a predetermined number of medicament portions remains in the blister pack;
    (c) returning the filled dispensing pack to a same or a different automated storage facility if the filled dispensing pack is not to be released yet;
    recording the number and arrangement of the medicament portions contained in the blister pack when the blister pack is being detected in step (a) and are saved in relationship to the identifying data and/or detecting the number and arrangement of the medicament portions contained in the blister pack following the removal of the blister pack in step (b1) and prior to the removal or, respectively, the separation of the at least one medicament portion in step (b2); and
    storing at least one blister pack in the automated storage facility by attaching the at least one blister pack to a carrier or placing the at least one blister pack upon a carrier, and forming the carrier in such a way that the operating device can grasp and transport the carrier together with the at least one blister pack.

2. The method in accordance with claim 1, further comprising equipping the carrier with a means of identification containing information identifying the carrier, and reading the means of identification of the carrier during or after the attachment or placement of the blister pack and relating the information identifying the carrier to the information identifying the blister pack.

3. The method in accordance with claim 1, further comprising transferring the information taken over and identifying the medicament pack to a means of identification of the carrier during or after the attachment or placement of the blister pack.

4. The method in accordance with claim 1, further comprising identifying the blister pack by data comprising dates and use-by dates identifying the medicament contained in the medicament portions.

5. The method in accordance with claim 1, further comprising recording the number of medicament portions contained in the blister pack when the blister pack is stored in step (a) and saving in relationship to the identifying data, and incrementing this stored number appropriately at the time of removal or, respectively, separation of the at least one medicament portion in step (b2).

6. The method in accordance with claim 1, further comprising recording the number and/or arrangement of the medicament portions contained in the blister pack after the removal of the blister pack in step (b1) and prior to the removal or, respectively, separation of the at least one medicament portion in step (b2) by measuring the removed blister pack.

7. The method in accordance with claim 1, further comprising separating the at least one medicament portion from the blister pack in step (b2) so that it will remain enclosed by a separate blister segment.

8. The method in accordance with claim 1, further comprising removing the at least one medicament portion from the blister pack in step (b2) by squeezing it out and filling the medicament portion into a reception chamber of the dispensing pack immediately following its removal in step (b3).

9. The method in accordance with claim 8, further comprising squeezing out and directly filling the medicament portion in in such a way that it will not touch any parts of the separation device.

10. The method in accordance with claim 1, further comprising removing the medicament pack in step (a1) from the storage facility or from another storage facility and automatically taking the identifying information in step (a3) from a control device of the automated storage facility.

11. The method in accordance with claim 10, further comprising removing in step (a1) the medicament pack from the same automated storage facility in which the blister pack is stored in step (a4), and storing the blister pack in storage areas of the same type or in storage areas specially adapted to the storage of blister packs.

12. The method in accordance with claim 1, further comprising removing in step (a2) the blister pack manually by an operator and taking in step (a3) the identifying information comprises reading a means of identification of the medicament pack.

13. The method in accordance with claim 12, wherein the means of identification comprises a barcode of the medicament pack, and taking in step (a3) the identifying information comprises reading the barcode.

14. A method for need-based commissioning of medicament portions in dispensing packs, comprising:
transporting a medicament pack containing at least one blister pack in an outer package to a repackaging station;
extracting the at least one blister pack from the outer package;
taking and storing identifying information of the medicament pack as identifying data of the at least one extracted blister pack;
providing at least one dispensing pack to be filled at an automated filling station and filling the at least one dispensing pack with medicament portions from the extracted blister pack, wherein the extracted blister pack is returned to an automated storage facility if at least a predetermined number of medicament portions remain in the extracted blister pack; and
returning the filled dispensing pack to a same or a different automated storage facility if the filled dispensing pack is not to be released yet.

15. The method of claim 14, further comprising:
providing the automated storage facility and chaotically storing a plurality of different medicament packs under optimal utilization of space on storage surfaces of level shelves or slanted chutes; and
placing onto or removing from the storage surfaces the plurality of different medicament packs with the aid of at least one computer-controlled operating device.

16. The method of claim 14, further comprising:
(a4) storing the at least one blister pack into the automated storage facility, and relating the identifying information stored as identifying data to the identifications of the storage sites.

17. The method of claim 14, further comprising:
removing a blister pack containing a type of medicament to be filled from the automated storage facility by means of the operating device or of one of the operating devices and transporting the blister pack to the filling station;
removing at least one individual medicament portion from the blister pack or separating at least one individual medicament portion from the blister pack by a device for the separation of medicament portions, and identifying the number of medicament portions remaining in the blister pack; and
filling the at least one removed or separated medicament portion into at least one predetermined reception chamber of the dispensing pack.

18. The method of claim 17, further comprising:
recording the number and arrangement of the medicament portions contained in the blister pack prior to the transporting;
saving in relationship to the identifying data and/or detecting the number and arrangement of the medicament portions contained in the blister pack; and
storing at least one blister pack in the automated storage facility by attaching the at least one blister pack to a carrier or placing the at least one blister pack upon a carrier, and forming the carrier in such a way that the operating device can grasp and transport the carrier together with the at least one blister pack.

* * * * *